United States Patent
Kroon et al.

[11] Patent Number: 5,680,506
[45] Date of Patent: Oct. 21, 1997

[54] APPARATUS AND METHOD FOR SPEECH SIGNAL ANALYSIS

[75] Inventors: Peter Kroon, Green Brook; Suhas A. Pai, Tinton Falls; Frank Kao-Ping Soong, Warren, all of N.J.

[73] Assignee: Lucent Technologies Inc., Murray Hill, N.J.

[21] Appl. No.: 368,059

[22] Filed: Dec. 29, 1994

[51] Int. Cl.$^6$ .............................. G10L 3/02; G10L 9/14; G10L 5/06

[52] U.S. Cl. .................. 395/2.12; 395/2.2; 395/2.26; 395/2.28; 395/2.63; 395/2.65; 379/58

[58] Field of Search .......................... 379/58, 59, 63, 379/88, 89; 395/2.16, 2.28, 2.38, 2.53, 2.62, 2.55, 2.65, 2.3, 2.2, 2.26, 2.63, 2.12; 381/36, 37, 41, 43, 49; 370/110.3

[56] References Cited

U.S. PATENT DOCUMENTS

| | | | |
|---|---|---|---|
| 4,292,470 | 9/1981 | An | 395/2.62 |
| 4,297,528 | 10/1981 | Beno | 395/2.53 |
| 4,412,098 | 10/1983 | An | 381/43 |
| 4,625,286 | 11/1986 | Papamichalis et al. | 395/2.28 |
| 4,689,760 | 8/1987 | Lee et al. | 370/110.3 |
| 4,701,954 | 10/1987 | Atal | 395/2.25 |
| 4,737,976 | 4/1988 | Borth et al. | 379/89 |
| 4,811,398 | 3/1989 | Copperi et al. | 381/37 |
| 4,885,637 | 12/1989 | Shikakura et al. | 348/409 |
| 4,910,784 | 3/1990 | Doddington et al. | 395/2.6 |
| 4,926,482 | 5/1990 | Frost et al. | 395/2.38 |
| 4,975,957 | 12/1990 | Ichikawa et al. | 381/36 |
| 5,014,317 | 5/1991 | Kita et al. | 395/2.83 |
| 5,027,404 | 6/1991 | Taguchi | 395/2.3 |
| 5,054,074 | 10/1991 | Bakis | 381/41 |
| 5,067,158 | 11/1991 | Arjmand | 381/51 |
| 5,095,508 | 3/1992 | Fujimoto | 381/43 |
| 5,101,434 | 3/1992 | King | 381/43 |
| 5,157,727 | 10/1992 | Schloss | 395/2.22 |
| 5,280,562 | 1/1994 | Bahl et al. | 395/2 |
| 5,297,183 | 3/1994 | Bareis et al. | 379/59 |
| 5,297,203 | 3/1994 | Rose et al. | 380/9 |
| 5,327,520 | 7/1994 | Chen | 395/2.28 |
| 5,394,473 | 2/1995 | Davidson | 381/36 |
| 5,479,562 | 12/1995 | Fielder et al. | 395/2.38 |
| 5,495,555 | 2/1996 | Swaminathan | 395/2.16 |
| 5,509,104 | 4/1996 | Lee et al. | 395/2.65 |
| 5,550,543 | 8/1996 | Chen et al. | 341/94 |

OTHER PUBLICATIONS

Rabiner, L., and Juang, B.-H., *Fundamentals of Speech Recognition*, PTR Prentice-Hall, Inc., 1993, pp. 115–117, & 348–372.

Vary, P., et al., "A Regular–Pulse Excited Linear Predictive Codec," Speech Communication 7, North–Holland, 1988, pp. 209–215.

*Primary Examiner*—Krista M. Zele
*Assistant Examiner*—Scott Wolinsky

[57] ABSTRACT

The present invention provides a novel method of analyzing speech signals in order to reduce the computational power required to perform both speech compression and voice recognition operations. Digital speech signals are provided to a speech analyzer which generates a linear predictive coded (LPC) speech analysis signal that is compatible for use in both the voice recognition circuit and the speech compression circuit. The speech analysis signal is then provided to the compression circuit, which further processes the signal into a form used by an encoder and then the encoder encodes the processed signal. The same speech analysis signal is also provided to a voice recognition circuit, which further processes the signal into a form used by a recognizer and then the recognizer performs recognition on the processed signal.

41 Claims, 3 Drawing Sheets

APPARATUS AND METHOD FOR SPEECH SIGNAL ANALYSIS

FIELD OF THE INVENTION

The present invention relates generally to the field of speech signal analysis, and particularly to the use of speech signal analysis in speech compression and voice recognition applications.

BACKGROUND OF THE INVENTION

Speech signal analysis is used to characterize the spectral information of an input speech signal. Speech signal analysis techniques are employed in a variety of systems, including voice recognition and digital speech compression. One popular method of analyzing speech signals uses linear predictive coding (LPC). In linear predictive coding, each sample of a digital input speech signal is represented as a combination of an innovation sample and a weighted series of past speech samples. The series coefficients, or weights, are referred to as LPC coefficients. Real-time LPC analysis of speech signals is a computationally burdensome process.

Many voice recognition devices currently use LPC speech analysis techniques to generate useful spectral information about an input speech signal. In voice recognition, LPC techniques are employed to create observation vectors, which are used by voice recognizers. These observation vectors are compared or matched to stored model vectors in order to recognize the input speech. Voice recognition systems have been utilized in various industries, including telephony and consumer electronics. For example, mobile telephones may employ voice recognition to allow "hands free" dialing, or voice dialing.

Speech compression methods, which are used in digital voice transmission, also employ LPC techniques to generate vectors representative of the input speech. These vectors are included as part of the compressed or encoded speech signal. Digital voice transmission systems using such compression techniques have been used in digital cellular telephone systems to reduce the bandwidth requirements of communication channels. The form of spectral vectors used in voice recognition and speech compression often differ substantially.

Certain applications of speech compression and voice recognition overlap. For example, a digital cellular telephone may transmit compressed digital speech signals and offer a voice recognition-based dialing operation. A mobile, transportable, or portable cellular telephone having voice recognition capabilities is considered highly desirable because it allows a vehicle operator to dial the telephone without diverting his or her eyes and hands away from the task of driving. A cellular phone having both capabilities requires circuitry operable to perform the speech compression tasks, as well as circuitry operable to perform the voice recognition tasks. The additional circuitry necessary to provide both services can add to the physical size and weight of the telephone, which is undesirable.

One method of consolidating such circuitry is to combine the functionality of the voice recognition and speech compression into a circuit having only one digital signal processing (DSP) device. Such consolidation can result in a reduction in physical size and weight. Unfortunately, the computational power required to perform both speech compression and voice recognition exceeds the capabilities of typical commonly available DSP devices. Therefore, such a combination circuit would require a more powerful and expensive DSP device. Circuit designers are thus confronted with a tradeoff between the use of expensive components and the need for reduced weight and part count.

SUMMARY OF THE INVENTION

The present invention provides a novel method of analyzing speech signals in order to reduce the computational power required to perform both speech compression and voice recognition operations. By defining a shared speech analysis signal compatible with both speech compression and voice recognition, speech analysis need only be performed once for both operations. As a result, the processing power requirements in a device that performs both operations is greatly reduced.

In one embodiment, digital speech signals are provided to a speech analyzer which generates a linear predictive coded (LPC) speech analysis signal that is compatible for use in both a voice recognition circuit and a speech compression circuit. The speech analysis signal is provided to the compression circuit, which further processes the signal into a form used by an encoder. The encoder then encodes the processed signal. The same speech analysis signal is also provided to a voice recognition circuit, which further processes the signal into a form used by a recognizer. The recognizer then performs recognition on the processed signal.

In an alternative embodiment, the speech analysis signal is provided to a speech compression circuit which encodes the signal. The encoded signal is then transmitted to a remote system that receives the encoded signal, regenerates the speech analysis signal, and uses the analysis signal in a voice recognition circuit.

In both embodiments, the portion of speech processing which is most computationally burdensome in speech compression and voice recognition is performed only once for use in both types of subsequent operations.

The above discussed features, as well as other features and advantages of the present invention, will become more readily apparent by reference to the following detailed description and accompanying drawings.

DETAILED DESCRIPTION OF THE DRAWINGS

Figure 1:
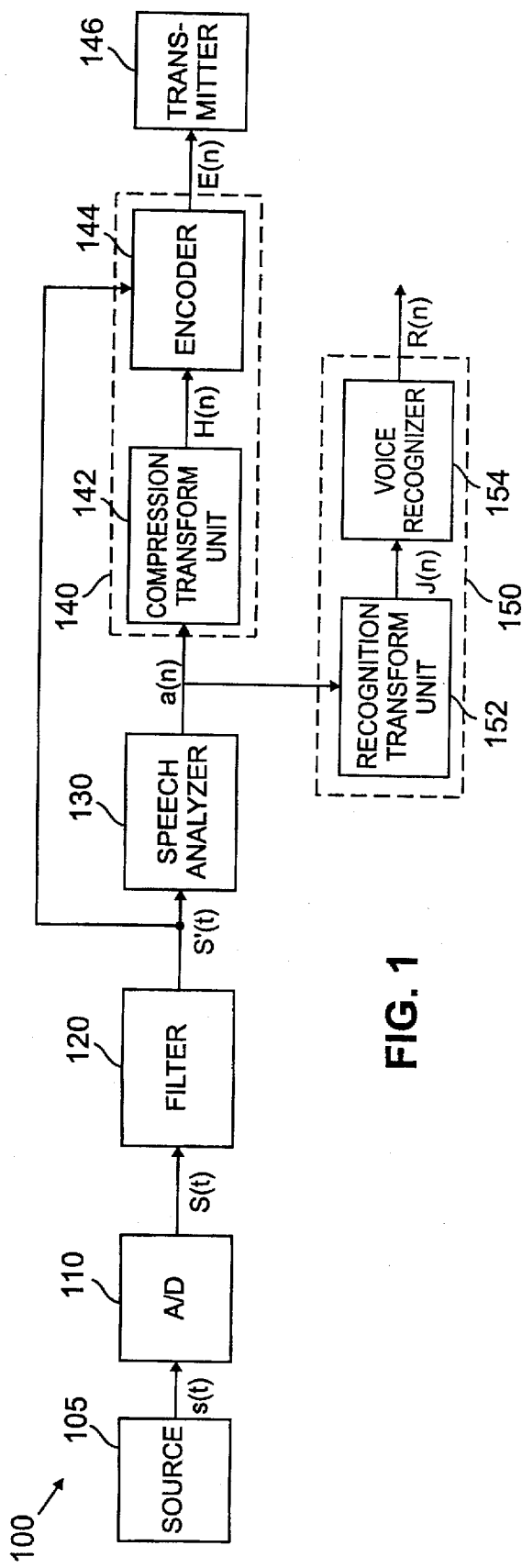
FIG. 1 shows a functional block diagram of a system that analyzes, encodes and recognizes speech according to the present invention.

FIG. 1 shows a functional block diagram of a system 100 that analyzes, encodes and recognizes speech according to the present invention. In particular, the system 100 receives an analog speech signal, s(t), and performs both digital signal compression and voice recognition on the received speech signal. The system thus produces two output signals, an encoded digital signal EN and a recognition output signal RE. The system 100 may, for example, be integrated into a "hands free" digital cellular telephone apparatus. Such an apparatus would then communicate over a cellular network using encoded digital signals while simultaneously recognizing the users' speech to determine whether a command is being given.

For example, consider a user communicating with another person or machine using a "hands free" digital cellular telephone that includes the system 100. When the user wishes to terminate the connection, the user simply speaks the words "hang up" and the cellular phone would then disconnect. In order to detect a "hang up" command during an active telephone conversation, the telephone must perform speech recognition in an ongoing manner while the phone is in use. Other voice commands, such as those pertaining to volume control or answering other lines, may also be invoked during a conversation. The system 100 facilitates such functionality by simultaneously encoding the speech signal for transmission and recognizing the input speech signal.

The elements of the system 100 in FIG. 1 are discussed in block diagram form for purposes of clarity. Those of ordinary skill in the art could readily implement the detailed circuitry and corresponding programming required to perform the operations of the system 100 as they are described below. For example, the functions of the system 100 may be executed by one or more digital signal processors programmed to perform the functions described below. In general, the system 100 receives analog speech signals and performs both voice recognition and digital compression thereon.

The system 100 preferably includes an analog-to-digital (A/D) converter 110 connected to a filter 120, which is in turn connected to a speech analyzer 130. The system 100 further includes a speech compression circuit 140 and a voice recognition circuit 150, both connected to the speech analyzer 130. The speech compression circuit 140 further includes a compression transform unit 142 connected to an encoder 144. The encoder 144 is also connected to receive signals directly from the filter 120. The voice recognition circuit 150 further includes a recognition transform unit 152 connected to a recognizer 154.

In operation, the A/D converter 110 first receives an analog speech signal s(t) from a source 105, such as a microphone or similar device. The A/D converter 110 then samples the speech signal and provides a digital representation of the speech signal, S(t), to the filter 120. For current cellular phone applications, the A/D converter 110 may suitably use a sampling rate of 8 kHz and 12 to 16 bit samples. Suitable A/D converters are known to those of ordinary skill in the art.

The A/D converter 110 then provides the digital speech signal S(t) to the filter 120. The filter 120 filters S(t) and provides the resulting filtered digital speech signal, S'(t), to the speech analyzer 130. The filter 120 preferably comprises a digital filter operable to perform high pass filtering and preemphasis filtering. Suitable digital filters, such as filters implemented on programmable digital signal processing devices, are well known in the art. Exemplary filter characteristics are provided in the source code in the appendix.

When the speech analyzer 130 receives S'(t), it generates a speech analysis signal a(n) therefrom. The speech analyzer 130 provides the signal a(n) to both the speech compression circuit 140 and the voice recognition circuit 150. In the exemplary embodiment discussed herein, the speech analyzer 130 is operable to generate an analysis signal comprising a plurality of analysis or linear predictive coding (LPC) coefficient vectors. Other forms of an analysis signal may be used, including autocorrelation vectors and vectors derived from covariant matrices, all of which are similar to LPC vectors and are well known.

In particular, the speech analyzer 130 segments the incoming speech signal into a plurality of temporally adjacent windows, preferably on the order of 20 milliseconds in length. The windows may either be non-overlapping, or in other words, when one window ends, the next window begins, or overlapping. The use of non-overlapping windows, however, reduces the quantity of calculations required. The samples within the window are then further processed using a Hamming window, which weights the samples in order to deemphasize the samples at the edge of each window.

Then, for each window that is defined, the speech analyzer 130 generates the speech analysis signal a(n) including an analysis vector for the defined window. The analysis vector comprises a set of coefficients representative of the spectral characteristics of the window, n. In this embodiment, the speech analyzer 130 performs known digital signal processing techniques which generate a set of LPC coefficients corresponding to each window. Each analysis vector thus comprises a set of LPC coefficients for a particular window.

Typically, LPC coefficients for a finite length window are determined using a technique known as autocorrelation analysis. In particular, a set of P autocorrelation coefficients for a window are given by the equation:

$$ac(m) = \sum_{k=0}^{K-1-m} \hat{x}(k)\hat{x}(k+m),$$

for m=0 to P, where P is the order of analysis, ac(m) is the mth autocorrelation coefficient, K is the number of samples in each window, and $\hat{x}(k)$ is the kth sample in the window.

LPC analysis is next performed on the autocorrelation coefficients for each window, yielding an LPC coefficient set. The order of the analysis, or in other words, the number of LPC coefficients for each window is typically between 8 and 12. A known method for generating LPC coefficients from autocorrelation coefficients is to define a Toeplitz matrix using the autocorrelation coefficients and then solve the Toeplitz matrix using Durbin's method. An exemplary implementation of this method is given in the source code in the appendix in the routine entitled "process_lpc()".

For this embodiment, the resulting LPC coefficients define the speech analysis signal a(n). The speech analyzer 130 provides the speech analysis signal a(n) to both the speech compression circuit 140 and the voice recognition circuit 150.

The functions of the speech analyzer 130, discussed above, are readily implemented in circuitry, such as a digital signal processing (DSP) device, by those of ordinary skill in the art. The appendix to this application includes suitable source code for use in programming a DSP to operate as the speech analyzer 130.

The compression transform unit 142 of the speech compression circuit 140 receives the signal a(n) and transforms the signal a(n) into a form compatible with the encoder 144. The transform unit 142 is required because speech encoders typically do not encode speech signals in the form of unprocessed LPC coefficient vectors. Encoders ordinarily require such LPC vectors to be further processed, Accordingly, the compression transform unit 142 creates a compression transform signal H(n) from a(n) and provides H(n) to the encoder 144. The compression transform signal H(n) comprises a plurality of compression vectors, which are used directly by a speech encoder to encode speech for transmission.

The form of the compression vectors and thus the operation of the compression transform unit 142 depend upon the type of encoder used. Different known encoders employ different forms of vectors for encoding, but all include vectors that are derived from speech analysis signals, such as a(n), in other words, speech analysis signals comprising a plurality of windows, each window having a vector quantity representative of the spectral information therein.

Further details regarding the generation of the compression transformation vectors for one particular type of encoder that may be used in one embodiment of the present invention is discussed below in connection with FIG. 2(a). The functions of the compression transform unit 142 may readily be implemented in circuitry, such as a DSP device, by those of ordinary skill in the art.

The encoder 144 then encodes the compression transform signal and other processed portions of the digital speech signal to create an encoded signal EN. The encoded signal EN may then be transmitted by a transmitter 146 using known techniques.

As the compression transform unit 142 receives and processes the speech analysis signal a(n), the recognition transform unit 152 of the voice recognition circuit 150 also receives the signal a(n). As discussed above, recognizers do not operate directly with LPC coefficients, such as those that form a(n). Accordingly, the recognition transform unit 152 converts a(n) to a suitable observation sequence J(n), and provides this sequence J(n) to the recognizer 154. The observation sequence J(n) comprises a plurality of observation vectors used directly by a recognizer to recognize speech data.

The form of the observation vectors J(n) and thus the operation of the recognition transform unit 152 will depend upon the type of recognizer employed. Different known recognizers employ different forms of vectors for the recognition process, but all may be derived from speech analysis signals, such as a(n), wherein the speech analysis signals comprise a plurality of windows, each window having a vector quantity representative of the spectral information therein. For example, one popular type of voice recognizer uses vectors composed of cepstral coefficients, delta-cepstral coefficients and other values, all of which are generated from a speech analysis signal similar to a(n).

Any known device operable to transform such speech analysis signals into suitable observation vectors may be employed. Transform units operable to generate such vectors from a plurality of LPC coefficient vectors such as a(n) and suitable for use as the transform unit 152 are well known to those of ordinary skill in the art. Further details regarding the generation of the observation vectors for a particular voice recognizer are discussed below in connection with FIG. 2(b). In addition, the appendix contains suitable source code for programming a DSP to perform the operations of the recognition transform unit 152.

The recognizer 154 of the voice recognition circuit 150 performs voice recognition on the observation vectors J(n) to produce a recognition output signal RE. The recognizer may employ known techniques such as hidden Markov model (HMM) pattern matching or other dynamic programming techniques. The output signal preferably contains data representative of the lexicon of the input speech. For example, if the user speaks the words "hang up", the output signal produces a signal RE that is representative of the "hang up" command. Such signals may then be used by a microprocessor or other apparatus to perform specified operations. Further details regarding the operation of one suitable HMM-based recognizer are provided below in connection with FIG. 2(b).

The present invention thus provides a novel speech analyzer operable to provide speech analysis signals for both voice recognition purposes and speech compression purposes. By employing a shared window size and configuration, the speech analysis need only be generated once for use in both operations. Because the generation of LPC coefficient vectors is computationally burdensome, the present invention greatly reduces the signal processing required to perform both operations.

It should be noted that, at present, voice recognition techniques ordinarily process speech analysis signals having overlapping windows, also called frames. For example, one such prior art recognizer employs a window that is 45 ms in length, with consecutive windows being spaced 15 ms apart, creating an overlap of 30 ms. The overlapping window configuration introduces redundancy that reduces the recognition errors introduced by the abrupt edges of the windows.

Current speech compression techniques, however, are somewhat less sensitive to errors introduced by the window edges and therefore usually employ little or no overlapping. As a result, speech analysis signals for speech compression and voice recognition are not ordinarily compatible. The present invention, however, preferably employs non-overlapping windows in the speech analysis signal a(n) that is available for use by both the compression circuit 140 and the recognition circuit 150. The use of non-overlapping windows does not greatly increase the number of recognition errors in an ordinary recognition circuit, and the computation cost savings is significant.

The use of non-overlapping windows is transparent to the recognizer 154, although the same window format must be used in the training of the recognizer 154. Training is the step wherein the recognizer formulates a set of model vectors representative of different parts of human speech. Once trained, the recognizer 154 then performs recognition by matching each incoming observation vector with one of the set of model vectors.

Figure 2A:
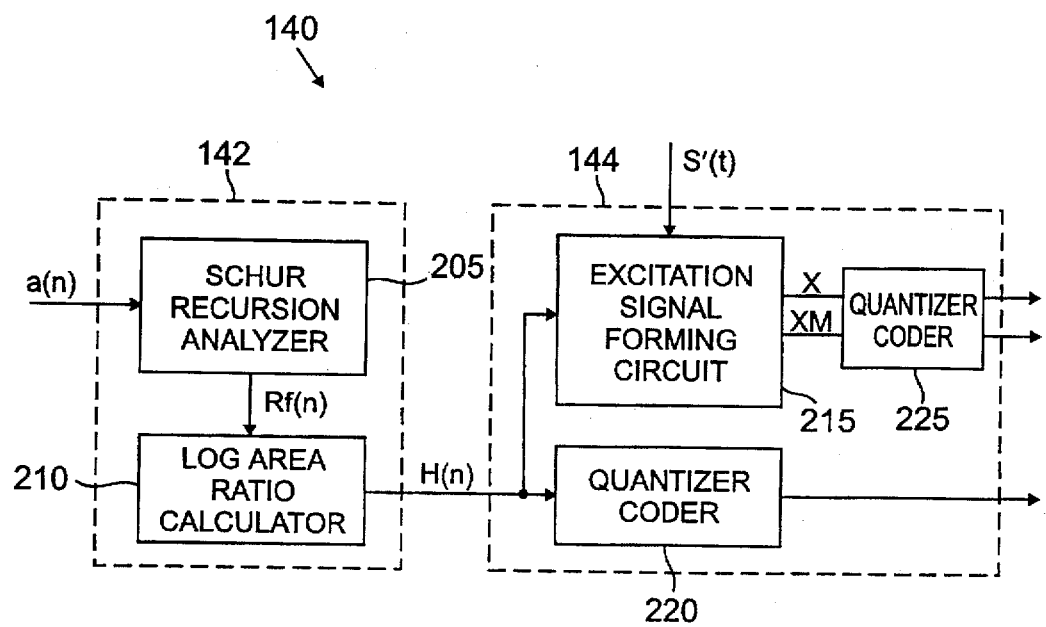
FIG. 2(a) shows an exemplary embodiment of a speech compression circuit which may be used in the system illustrated in FIG. 1.

FIG. 2(a) illustrates an exemplary embodiment of the speech compression circuit 140 illustrated in FIG. 1. The speech compression circuit 140 receives speech analysis signals, transforms them into a form compatible for encoding, and encodes them for transmission. The compression transform unit 142 may suitably include a recursion analyzer 205 and a log area ratio (LAR) calculator 210. The encoder 144 includes an excitation signal forming circuit 215 and two quantizer/coders 220 and 225.

The recursion analyzer 205 is connected between the speech analyzer 130 from FIG. 1 and the LAR calculator 210. The LAR calculator 210 is also connected to both the excitation signal forming circuit 215 and one 'of the quantizer/coders 220. The excitation signal forming circuit 215 is also connected to the other quantizer/coder 225 and the filter 120 from FIG. 1.

In operation, the signal a(n) is provided to the recursion analyzer 205 which performs Schur recursion analysis thereon, producing a signal, Rf(n). The Schur recursion analysis determines reflection coefficients from the received LPC coefficients in the signal a(n). As a result, the resulting Rf(n) is a vector signal, each vector comprising a set of reflection coefficients. A suitable Schur recursion analysis method is described in J. Schur "Über Potenzreihen, die im Innern des Einheitskreises beschränkt sind", J. Reine Angewandte Mathematik, Band 147, pp. 205–232 (1917), which is incorporated by reference herein.

The LAR calculator 210 then transforms the reflection coefficients Rf(n) into log-area ratios, LAR(n). In this embodiment, the log-area ratios LAR(n) constitute the compression vectors, or compression transform signal H(n), which is then provided to the encoder 144. For further details regarding the elements employed in such an embodiment of the compression transform unit 142, see P. Vary et al., "A Regular-Pulse Excited Linear Predictive Codec," Speech Communication No. 7, pp. 209–215 (1988), which is incorporated by reference herein.

The compression transform signal H(n) is thereafter provided to the first quantizer/coder 220 and the excitation signal forming circuit 215. In addition, the filtered digital speech signal S'(t) is also provided to the excitation signal forming circuit 215. The circuit 215 then uses the two signals to produce an excitation signal X and a log amplitude signal XM to the second quantizer/coder 225. Suitable excitation signal forming circuits capable of performing the above-described operations are discussed in P. Vary et al., above, at p. 210 and FIG. 1 and in U.S. Pat. No. 4,701,954, col. 4, line 49 to col. 8, line 14, which is also incorporated by reference herein.

Figure 2B:
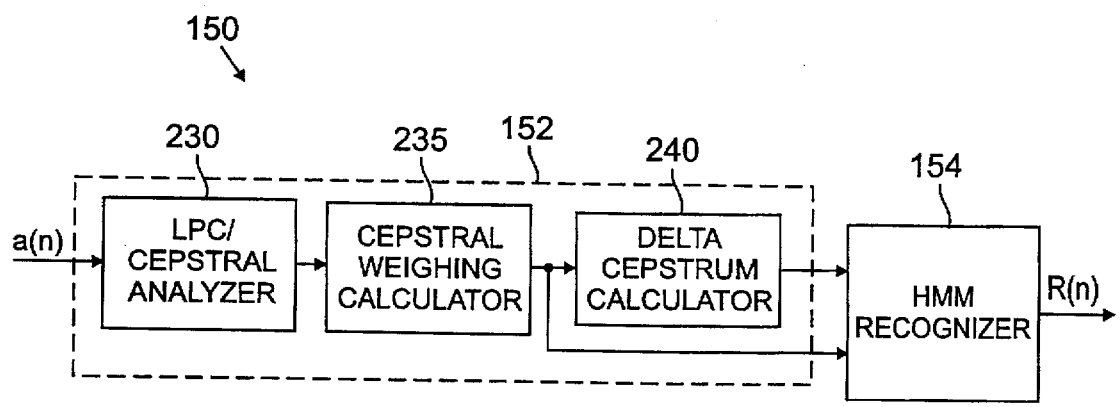
FIG. 2(b) shows an exemplary embodiment of a voice recognition circuit which may be used in the system illustrated in FIG. 1.

FIG. 2(b) illustrates an exemplary embodiment of the voice recognition circuit 150 illustrated in FIG. 1. The voice recognition circuit 150 is operable to receive the speech analysis signal a(n) and produce a recognition output signal RE therefrom.

The recognition transform unit 152 includes an LPC/cepstral analyzer 230, a cepstral weighting calculator 235, and a delta cepstrum calculator 240. The LPC/cepstral analyzer 230 is connected between the speech analyzer 130 from FIG. 1 and the cepstral weighing calculator 235. The cepstral weighting calculator 235 is also connected to both the delta cepstrum calculator 240 and the recognizer 154, which may suitably be a known type of HMM recognizer. The delta cepstrum calculator 240 is also connected to the HMM recognizer 154.

In operation, the LPC/ceptral analyzer 230 first receives the LPC coefficient vectors, or in other words, the speech analysis signal a(n). The analyzer 230 then performs a number of transforms on the LPC coefficients in order to generate a set of cepstral coefficients. Cepstral coefficients are the coefficients of a Fourier transform representation of the log magnitude spectrum. For details concerning these transformations, see Rabiner, et al., "Fundamentals of Speech Recognition" pp. 115–117 (PTR Prentice-Hall, Inc. 1993), which is incorporated by reference herein. The analyzer 230 provides the resulting information to the cepstral weighting calculator 235. There, the cepstral coefficients are weighted in order to compensate for differences in sensitivity at different parts of the speech spectrum, as discussed in Rabiner, et al., at p. 116.

The weighted cepstral coefficients are then provided to both the delta cepstrum analyzer 240 and the HMM recognizer 154. The delta cepstrum analyzer 240 generates a set of delta cepstrum coefficients which represent a time derivative of the cepstral coefficients. The generation of delta cepstrum coefficients is well known and discussed in detail in Rabiner, et al. at pp. 116–117. The resultant delta cepstrum coefficients are also provided to the HMM recognizer 154. In this embodiment, the weighted cepstral coefficients and the delta cepstrum coefficients provided to the HMM recognizer 154 both comprise a portion of each observation vector, in the signal J(n). The sequence of observation vectors J(n) is also known in the art as the observation sequence.

The HMM recognizer 154 then employs the observation sequence J(n) to perform recognition using hidden Markov model pattern matching techniques, which are known. In particular, the vectors in the observation sequence are matched to codebook model vectors to identify the speech content. The codebook model vectors are generated and stored during the training of the recognizer. For details regarding HMM speech recognizers, see Rabiner, et al. pp. 348–372, which is also incorporated by reference herein.

Figure 3A:
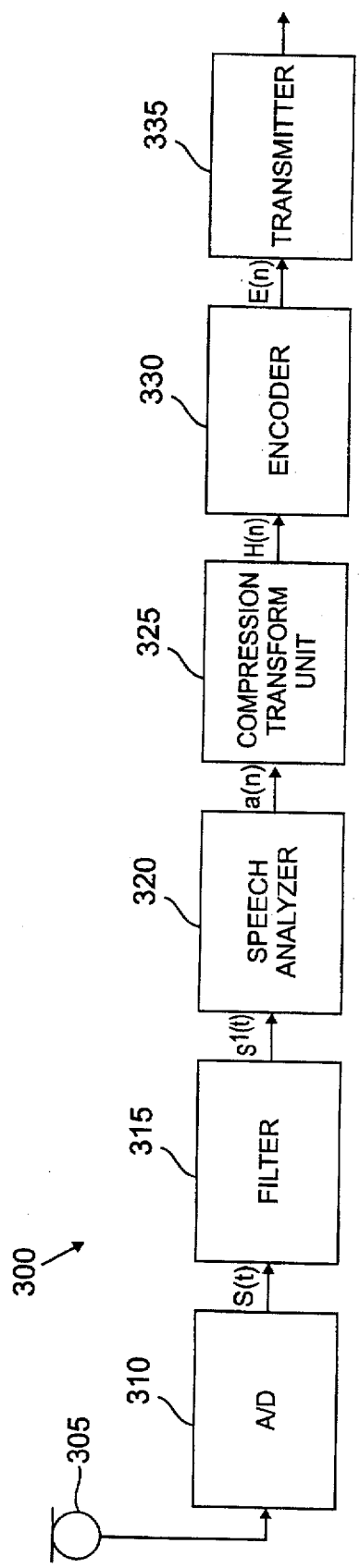
FIG. 3(a) shows a front end transmission system for transmitting encoded digital speech signals.
Figure 3B:
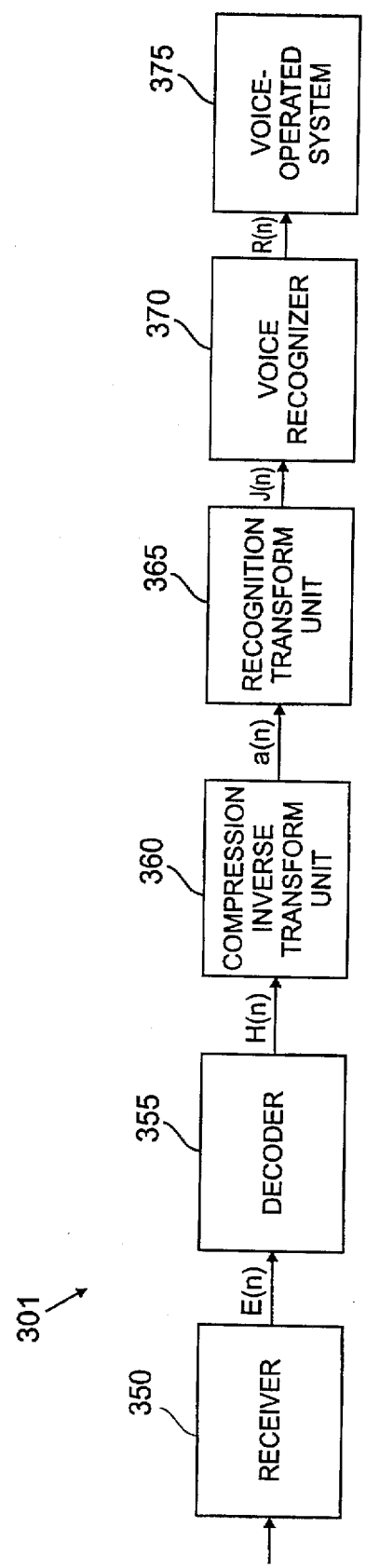
FIG. 3(b) shows a system for receiving encoded digital speech signals and performing voice recognition thereon.

The advantages of the present invention are not limited to devices in which voice recognition and speech compression occur in the same system. FIGS. 3(a) and 3(b) show a transmission system 300 and a reception system 301, respectively, that allow a user to communicate using compressed digital signals and to access and control a remote voice-operated, automated system. The voice-operated system may, for example, be an automatic banking machine or a telephone answering system.

FIG. 3(a) shows a front-end transmission system 300 for transmitting speech signals in the form of compressed digital signals. The system 300 may suitably comprise a portion of a digital cellular telephone. The system 300 includes, serially connected in the following order, a microphone 305, an A/D converter 310, a filter 315, a speech analyzer 320, a compression transform unit 325, an encoder 330 and a transmitter 335.

In general, a user may speak into the microphone 305 to provide vocal commands to a remote system such as the one depicted in FIG. 3(b) and discussed below. For example, the user may instruct a remotely located automatic banking machine to perform certain transactions using vocal commands.

In the operation of the system 300 in FIG. 3(a), the microphone 305 provides an analog voice signal s(t) having a particular lexicon to the A/D converter 310. The A/D converter 310 converts the analog speech signal s(t) into a digital signal and provides the digital signal, S(t), to the filter 315. The filter 315 provides high pass and preemphasis filtering of the speech signal to produce a filtered signal S'(t). The A/D converter 310 and the filter 315 may suitably be the same components as the A/D converter 110 and filter 120, respectively, illustrated in FIG. 1.

The speech analyzer 320 thereafter receives S'(t) from the filter 315, generates a speech analysis signal a(n) therefrom, which is provided to the compression transform unit 325. The speech analyzer 320 is operable to produce an analysis signal a(n) comprising a plurality of analysis vectors, or LPC vectors, in the same manner as discussed above in connection with FIG. 1.

The speech analyzer 320 first defines a plurality of windows, each window comprising a portion of the digital speech signal. Then, the speech analyzer 320 generates an LPC vector for each window, as discussed above in connection with FIG. 1. The LPC vectors for the plurality of windows that define the speech signal constitute the analysis signal a(n). The speech analysis signal parameters such as window size and configuration, as well as the order of the analysis, are chosen to be compatible with a far-end voice recognition circuit such as the one located in the system illustrated in FIG. 3(b) and discussed below.

The compression transform unit 325 receives the speech analysis signal a(n) and produces a compression transform signal H(n) therefrom. To this end, the compression transform unit 325 transforms the plurality of LPC coefficient vectors a(n) into compression transformation vectors H(n), which may suitably be of the type discussed above in connection with FIGS. 1 and 2(a). As above, the particular form of transformation vectors depends on the type of encoder used.

The transform unit 325 thereafter provides the compression transform signal H(n) to the encoder 330. The encoder 330 generates a corresponding encoded signal EN. The encoded signal EN is then provided to the transmitter 335 for transmission. If the system is employed in a cellular telephone, then the transmitter 335 would be a cellular telephone transmitter. Alternatively, in the future, residential telephones may be connected to a digital loop carrier that only transmits compressed digital signals. In such a system, the transmitter would simply be a residential telephone transmission device.

FIG. 3(b) shows a system 301 for receiving encoded digital speech signals and performing voice recognition thereon. The system 301 includes, serially connected in the following order, a receiver 350, a decoder 355, a compression inverse transform unit 360, a recognition transform unit 365, a voice recognizer 370, and a voice-operated system 375.

The receiver 350 receives transmitted signals from the transmission system described above in connection with FIG. 3(a). In general, the particular type of receiver depends on the type of transmitter used to transmit the signals, and those of ordinary skill in the art could readily implement a suitable receiver. The receiver 350 demodulates or otherwise generates the encoded signal En from the transmitted signal and provides En to the decoder 355. The decoder 355 is matched to the encoder 330 of FIG. 3(a), or in other words, it employs the same compression/decompression methods as the encoder 330.

The decoder 355 provides a decompressed signal, which is the compression transform signal of the originally transmitted speech signal, H(n), to the compression inverse transform unit 360. The compression inverse transform unit 360 is operable to perform the inverse transforms on H(n) to produce a speech analysis signal a(n) therefrom. To this end, the compression inverse transform unit 360 is matched to the compression transform unit 325 from FIG. 3(a), above. The resulting speech analysis signal a(n) comprises a plurality of LPC coefficient vectors, each vector representing the LPC coefficients of a window at time n.

The compression inverse transform unit 360 provides the reconstituted signal a(n) to a recognition transform unit 365 which may suitably have the same structure and operation as the recognition transform unit 152 discussed above in connection with FIGS. 1 and 2(b). The recognition transform unit 365 transforms the speech analysis signal a(n) into an observation sequence, J(n), which is provided to the recognizer 370.

The recognizer 370 then performs recognition on J(n) to generate a recognition output signal RE. The recognizer 370 may use recognition techniques both to ascertain the identity of the speaker and to identify vocal commands from the speaker. The recognizer 370 produces a recognition output signal RE representative of the vocal commands and provides the output signal to the voice-operated system 375. The voice-operated system 375 then performs various operations according to such commands.

For example, if the transmission system 300 is a digital telephone device and the receiving system 301 is part of an automated banking system, then the voice-operated system 375 may operate as an automated bank teller. The recognizer 370 could then match the voice of a remotely-located speaker to the speaker's bank account and then allow the speaker to manipulate the automated teller to perform account inquiries or transactions.

The present invention greatly reduces the circuitry required by such a system by defining a shared speech analysis signal for both compression and recognition. In doing so, the receiving system does not need to perform the calculation-intense process of completely synthesizing the transmitted speech signal. Instead, the receiving system need only partially synthesize the speech signal to the extent necessary to produce the speech analysis signal, a(n). The speech analysis signal may then be transformed to a form compatible with the voice recognizer. Because speech analysis, or in other words, the generation of LPC coefficient vectors, is computationally burdensome, the present invention produces significant savings in computation power and time.

Figure 4:
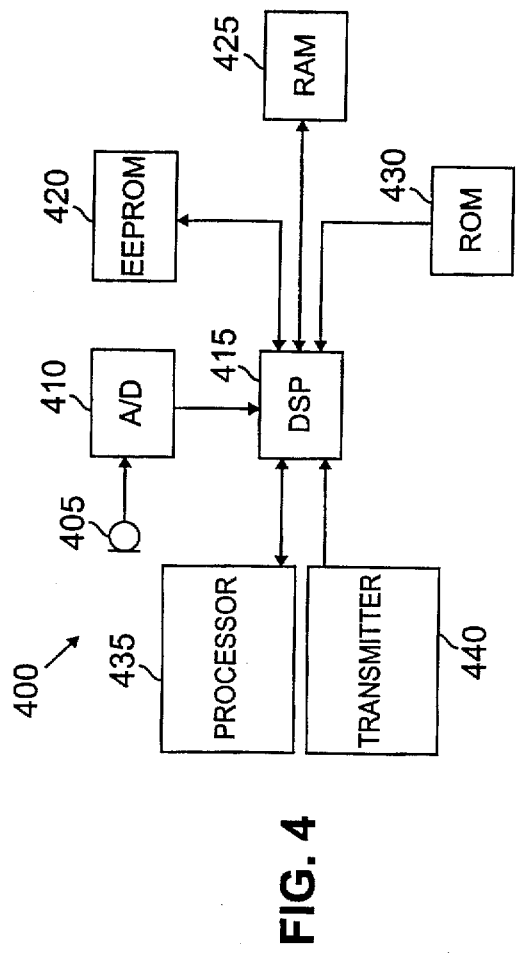
FIG. 4 shows an exemplary embodiment of the circuit in FIG. 1 using a digital signal processor.

FIG. 4 illustrates an exemplary speech processing circuit including an embodiment of the circuit 100 illustrated in FIG. 1 which may be implemented in a digital cellular telephone. The overall circuit 400 includes a digital signal processor (DSP) 415 having several data communication ports. The DSP 415 may suitably be an AT&T DSP16A. The communication ports of the DSP 415 are operably connected to each of an A/D converter 410, an electronically erasable programmable read only memory (EEPROM) 420, a random access memory (RAM) 425, a read-only memory (ROM) 430, a processor 435 and a transmitter 440. The A/D converter 410 is further connected to a condenser microphone 405.

In general, the microphone 405 serves as the speech signal input device or source. The microphone 405 provides an analog speech signal to the A/D converter 410. The A/D converter 410 thereafter samples the analog speech signal to provide a speech signal in a similar manner as the A/D converter 110 illustrated in FIG. 1. The A/D converter provides the digitized signal to the DSP 415.

The DSP 415, in cooperation with the EEPROM 420, the RAM 425, and the ROM 430, operates to perform the functions of the filter 120, the speech analyzer 130, the speech compression circuit 140 and the voice recognition circuit 150 in the circuit discussed above in connection with FIG. 1. One of ordinary skill in the art could readily program the DSP 415 to perform the above described functions. In addition, the appendix contains C-language source code that when programmed into a suitable DSP would perform the novel functions of the filter 120, speech analyzer 130, and the recognition transform unit 152 described above in connection with FIG. 1. The function of each of the memory devices 420, 425 and 430 with respect to the processes performed by the DSP 415 are briefly described below.

The EEPROM 420 is used in speech recognition operations to store the speech models or model vectors. During the voice recognition operation, the recognizer 154 from FIG. 1 receives the input speech observation sequence and matches the input speech to the model vectors generated in the training of the recognizer. The stored speech model vectors used for such matching are generated and stored within the EEPROM 420 during the training of the recognizer.

The RAM 425 is used during voice recognition to build and store temporary word models recognized in the input speech. To this end, after the recognizer 154 matches the input speech recognition vectors with the models in the EEPROM 420, the information is stored within the RAM 425 in order to string together the matched vectors to form recognized words.

The ROM 430 contains the programing instructions for the DSP 415, and thus contains the routines that perform the functions of the filter 120, the speech analyzer 130, the compression transform unit 142, the encoder 144, the recognition transform unit 152, and the recognizer 154.

The processor 435, which may suitably be a microprocessor or microcontroller, provides overall control of the telephone circuit, including the DSP 415. Another function of the processor is to receive voice-recognized commands from the DSP 415 and carry out the command instructions. Thus, if a user issues the vocal command "hang up", then the DSP 405 will recognize the command and provide the command to the processor 435, which in turn will disconnect the telephone connection.

The transmitter 440 receives the encoded digital speech signal from the DSP 415 and transmits the signal over the cellular network, not shown. The network effects point-to-point communications with another telephone in a well known manner.

The present invention allows the use of one DSP to perform all of the above-described speech signal processing functions because the most computationally burdensome process, the speech analysis, is only performed once for both speech compression and voice recognition.

The above-described embodiments of the invention are merely illustrative. Other implementations may readily be devised by those skilled in the art which will embody the principles of the invention and fall within the spirit and scope thereof. For example, the use of LPC coefficients as the speech analysis signal is given by way of example only. The speech analysis signal may also comprise autocorrelation coefficients, or covariant matrix coefficients which are well known in the art. The conversion of such coefficients to both the compression transform signal and the voice recognition observation sequence is well known.

We claim:

1. A method for providing a speech analysis signal for use in a speech compression circuit including an encoder and a voice recognition circuit including a recognizer, the method comprising the steps of:
   a) receiving a digital speech signal;
   b) analyzing the digital speech signal and producing a speech analysis signal therefrom, said speech analysis signal compatible for use within the speech compression circuit and the voice recognition circuit;
   c) providing said speech analysis signal to the speech compression circuit for subsequent transformation into a form compatible with the encoder; and
   d) providing said speech analysis signal to the voice recognition circuit for subsequent transformation into a form compatible with the recognizer.

2. The method of claim 1 wherein step b) includes the steps of:
   defining a plurality of windows, each window comprising a temporal portion of the digital speech signal, such that the plurality of windows comprise the digital speech signal; and
   generating a speech analysis signal by generating a vector for each of the plurality of windows.

3. The method of claim 2 wherein the plurality of windows comprises a plurality of non-overlapping windows.

4. The method of claim 2 wherein the step of generating a vector further comprises generating a set of autocorrelation coefficients for each defined window.

5. The method of claim 2 wherein the step of defining a plurality of windows comprises defining a plurality of non-overlapping windows, each window having a duration of substantially 20 msecs.

6. The method of claim 1 wherein the step of producing a speech analysis signal includes producing a linear predictive coded (LPC) speech analysis signal.

7. A method of processing speech signals comprising the steps of:
   a) receiving an analog input speech signal;
   b) converting the analog input speech signal to a digital speech signal;
   c) analyzing the digital speech signal and producing a speech analysis signal therefrom, said speech analysis signal comprising a plurality of analysis vectors;
   d) performing speech compression transformations on the plurality of analysis vectors to produce a plurality of compression transformation vectors;
   e) employing an encoder to produce a compressed speech signal using the compression transformation vectors;
   f) performing voice recognition transformations on the plurality of analysis vectors to produce a plurality of observation vectors; and
   g) performing voice recognition using the observation vectors.

8. The method of claim 7 wherein step c) further comprises:
   defining a plurality of windows, each window comprising a portion of the digital speech signal, such that the plurality of windows comprise the digital speech signal; and
   generating a speech analysis signal by generating an analysis vector for each defined window.

9. The method of claim 8 wherein the plurality of windows comprises a plurality of non-overlapping windows.

10. The method of claim 8 wherein the step of generating an analysis vector further comprises generating a set of autocorrelation coefficients for each defined window.

11. The method of claim 10 wherein step d) further comprises generating reflection coefficients from the autocorrelation coefficients for each defined window.

12. The method of claim 10 wherein step f) further comprises:
   generating a plurality linear predictive coding coefficients from the plurality of autocorrelation coefficients; and
   generating a plurality of cepstral coefficients from the plurality of linear predictive coding coefficients.

13. The method of claim 7 further comprising the step of filtering the digital speech signal prior to performing step c).

14. The method of claim 13 wherein the step of filtering the digital speech signal further comprises effecting high pass filtering and preemphasis filtering on the digital speech signal.

15. The method of claim 7 wherein step g) further comprises performing hidden Markov model pattern matching between a stored plurality of model vectors and the plurality of observation vectors.

16. A method of processing a compressed digital speech signal, said compressed digital signal being generated by a remotely-located user, the method comprising the steps of:
   a) receiving the compressed digital speech signal;
   b) decoding the compressed digital speech signal to produce a compression transform signal;
   c) inversely transforming the compression transform signal to produce a speech analysis signal comprising a plurality of speech analysis vectors;
   d) performing voice recognition transformations on the plurality of analysis vectors to produce a plurality of observation vectors; and e) performing voice recognition on said observation vectors to produce a recognition output signal therefrom.

17. The method of claim 16 wherein step b) further comprises the steps of dequantizing the compressed digital speech signal and interpolating the dequantized compressed digital speech signal.

18. The method of claim 16 wherein step c) further comprises:

generating a plurality of linear predictive coding coefficients using the plurality of analysis vectors; and generating a plurality of cepstral coefficients from the plurality of linear predictive coding coefficients.

19. The method of claim 16 wherein step d) further comprises performing hidden Markov model pattern matching between a plurality of codebook vectors and the plurality of observation vectors.

20. The method of claim 16 wherein each of said analysis vectors comprises a plurality of autocorrelation coefficients representative of a spectral analysis of a portion of the digital speech signal.

21. The method of claim 16 further comprising the step of using the recognition output signal to cause a selected operation to be performed.

22. The method of claim 16 further comprising the step of using the recognition output signal to identify the remotely-located user.

23. An apparatus for processing digital speech signals comprising:

a) a speech analyzer having an input for receiving a digital speech signal, said speech analyzer operating to define a plurality of windows, each window corresponding to a portion of the digital speech signal, means operably connected to the input;

and to generate an analysis vector for each window on an output, said analysis vector representative of the spectral characteristics of the portion of the speech signal corresponding to the window;

b) a speech recognition circuit connected to the output of the speech analyzer for processing said analysis vectors; and c) a speech compression circuit connected to the output of the speech analyzer for processing said analysis vectors.

24. The apparatus of claim 23 wherein the plurality of windows comprises a plurality of non-overlapping windows.

25. The apparatus of claim 23 wherein the speech analyzer further comprises a programmed digital signal processor.

26. An apparatus for processing speech signals comprising:

a) a speech analyzer having an input and an output, the speech analyzer operable to receive a speech signal at the input and produce a speech analysis signal at the output;

b) a compression transform unit connected to the speech analyzer output and operable to transform the speech analysis signal into a compression transform signal for use in an encoder circuit;

c) an encoder circuit connected to the compression transform circuit to receive the compression transform signal therefrom, and operable to encode the compression transform signal;

d) a recognition transform unit connected to the speech analyzer output and operable to transform the speech analysis signal into an observation sequence for use in a recognizer; and e) the recognizer connected to the recognition transform unit to receive the observation sequence therefrom.

27. The apparatus of claim 26 wherein the speech analyzer defines a plurality of windows, each window comprising a portion of the speech signal, such that the plurality of windows comprise the speech signal;

generates an analysis vector for each defined window; and generates a speech analysis signal comprising the plurality of generated analysis vectors.

28. The apparatus of claim 27 wherein the plurality of windows comprise a plurality of non-overlapping windows.

29. The apparatus of claim 26 wherein each of the analysis vectors includes a plurality of linear predictive coding (LPC) coefficients and the compression transform unit is further operable to transform LPC coefficients into reflection coefficients.

30. The apparatus of claim 26 wherein each of the analysis vectors includes a plurality of linear predictive coding (LPC) coefficients and the recognition transform unit is further operable to transform LPC coefficients into cepstral coefficients.

31. The apparatus of claim 26 wherein each of the analysis vectors includes a plurality of linear predictive coding (LPC) coefficients and the recognition transform unit is operable to:

transform LPC coefficients into cepstral coefficients; and transform LPC coefficients into delta cepstrum coefficients.

32. The apparatus of claim 26 wherein the recognizer comprises a hidden Markov model recognizer.

33. The apparatus of claim 26 wherein the apparatus for processing speech signals comprises a digital cellular telephone.

34. An apparatus for processing analog speech signals in a digital cellular telephone, said apparatus comprising:

a) an analog-to-digital converter;

b) a speech analyzer having an input and an output, the input connected to the analog-to-digital converter, the speech analyzer operable to receive a speech signal at the input and produce a speech analysis signal at the output, the speech analysis signal comprising a plurality of linear predictive coding (LPC) vectors;

c) a compression transform unit connected to the speech analyzer output and operable to transform the speech analysis signal into a compression transform signal for use in an encoder circuit;

d) an encoder circuit connected to the compression transform circuit to receive the compression transform signal therefrom, and operable to encode the compression transform signal;

e) a recognition transform unit connected to the speech analyzer output and operable to transform the speech analysis signal into an observation sequence for use in a recognizer;

f) a recognizer connected to the recognition transform unit to receive the observation sequence therefrom; and g) a transmitter connected to the encoder circuit.

35. An apparatus for transmitting compressed digital speech signals comprising:

a) a speech analyzer having an input and an output, the speech analyzer operable to receive a speech signal at the input and produce a speech analysis signal at the output, the speech analysis signal comprising a plurality of linear predictive coding (LPC) vectors, said speech analysis signal compatible for use in a remotely-located voice recognizer;

b) a compression transform unit connected to the speech analyzer output and operable to transform the speech analysis signal into a format suitable for use in an encoder circuit;

c) an encoder circuit connected to the compression transform circuit to receive transformed speech analysis signals therefrom; and d) a transmitter connected to the encoder circuit, the transmitter operable to transmit an encoded signal to a receiver circuit including the remotely-located voice recognizer.

36. The apparatus of claim 35 wherein the speech analyzer is operable to:

define a plurality of windows, each window comprising a portion of the speech signal, such that the plurality of windows comprise the speech signal; and generate a speech analysis signal comprising a plurality of LPC vectors with each of said plurality of LPC vectors generated for a corresponding one of the plurality of windows.

37. The apparatus of claim 36 wherein the plurality of windows comprise a plurality of non-overlapping windows.

38. An apparatus for receiving and processing compressed digital speech signals comprising:

a) a signal receiver operable to receive compressed digital speech signals from a remotely located transmitter and to produce at an output received compressed digital speech signals;

b) a compression inverse transform unit connected to the output of the signal receiver and operable to transform the received compressed digital speech signals into linear predictive coding (LPC) vector signals;

c) a recognition transform unit connected to the compression inverse transform unit and operable to produce transformed LPC vector signals in a format compatible for use in a recognizer;

d) the recognizer connected to the output of the recognition transform unit to receive the transformed speech analysis signals therefrom.

39. An apparatus for providing speech signal processing in a digital cellular telephone comprising:

a) a microphone;

b) an analog-to-digital converter connected to the microphone;

c) a digital signal processor operably connected to receive a digital speech signal from the analog-to-digital converter, the digital signal processor operable to perform speech compression on the digital speech signal to produce an encoded signal, and further operable to perform voice recognition on the digital speech signal to produce a recognized signal; and d) a transmitter operably connected to receive the encoded signal from the digital signal processor.

40. The apparatus of claim 39 further comprising a first memory connected to the digital speech processor for storing a plurality of speech models and wherein the digital signal processor uses the speech models to perform voice recognition.

41. The apparatus of claim 39 wherein the digital cellular telephone is operable to receive a voice command and the recognized signal comprises a signal representative of a lexicon of the voice command.

* * * * *